(12) United States Patent
Jarke et al.

(10) Patent No.: US 7,240,623 B2
(45) Date of Patent: Jul. 10, 2007

(54) FOAM DESK

(76) Inventors: Joseph M. Jarke, 6108 Dedham La., Austin, TX (US) 78739; Joseph M. Jarke, Jr., 6108 Dedham La., Austin, TX (US) 78739

( * ) Notice: Subject to any disclaimer, the term of this patent is extended or adjusted under 35 U.S.C. 154(b) by 0 days.

(21) Appl. No.: 10/834,601

(22) Filed: Apr. 26, 2004

(65) Prior Publication Data
US 2004/0261668 A1    Dec. 30, 2004

Related U.S. Application Data

(60) Provisional application No. 60/465,959, filed on Apr. 28, 2003.

(51) Int. Cl.
*A47B 23/00* (2006.01)
(52) U.S. Cl. .................................................. 108/43
(58) Field of Classification Search .................. 108/43, 108/48, 42, 44, 25, 26, 24, 1; 297/423.41, 297/423.46, 423.44; 5/507.1; 288/444, 288/454, 246.01, 346.05, 346.2
See application file for complete search history.

(56) References Cited

U.S. PATENT DOCUMENTS

| | | | | |
|---|---|---|---|---|
| 2,979,990 A | * | 4/1961 | Alexander | ............... 108/43 |
| 4,235,472 A | * | 11/1980 | Sparks et al. | ............... 108/43 |
| 4,700,634 A | * | 10/1987 | Mills et al. | ............... 108/43 |
| 4,765,583 A | * | 8/1988 | Tenner | ............... 108/43 |
| 4,790,041 A | * | 12/1988 | Shtull | ............... 108/43 |
| 5,081,936 A | * | 1/1992 | Drieling | ............... 108/43 |
| 5,143,341 A | * | 9/1992 | Juster | ............... 248/444 |
| 5,360,017 A | * | 11/1994 | Austin | ............... 5/640 |
| 5,381,717 A | * | 1/1995 | Brokaw | ............... 84/327 |
| 5,765,790 A | * | 6/1998 | Kuldvere | ............... 108/43 |
| D413,209 S | | 8/1999 | Jarke | |
| 6,041,715 A | | 3/2000 | Jarke et al. | |
| 6,173,656 B1 | * | 1/2001 | Blanchard | ............... 108/43 |
| 6,349,729 B1 | * | 2/2002 | Meyer et al. | ............... 108/43 |
| 6,374,751 B1 | * | 4/2002 | With | ............... 108/43 |
| 6,571,922 B1 | * | 6/2003 | Ruhmanseder | ............... 108/43 |

FOREIGN PATENT DOCUMENTS

| | | | |
|---|---|---|---|
| DE | 3728717 A1 | * | 3/1989 |
| EP | 583556 A1 | * | 2/1994 |
| JP | 06141951 A | * | 5/1994 |

\* cited by examiner

*Primary Examiner*—José V. Chen

(57) ABSTRACT

The disclosure describes is a portable activity surface with foam construction with various utilitarian features and configurations.

16 Claims, 5 Drawing Sheets ated by an angle 25. This can most easily be
FOAM DESK

RELATED APPLICATION

This application claims priority to Provisional Application No. 60/465,959 filed on Apr. 28, 2003.

DESCRIPTION OF THE RELATED ART

The present invention generally relates to portable work surfaces. More particularly the present invention is useful without limitation as a lap desks for use in bed or on a sofa or chair or in a bathtub, hot tub or swimming pool to provide a work surface for laptop computer or keyboard, books, papers or as a foot rest or as a stand to hold books or papers and as a cafeteria tray.

BACKGROUND

It is frequently necessary or desirable to have a portable tray or activity surface, particularly when traveling or when sitting on a couch or recliner, or sitting up in bed. Prior efforts to address this need include devices in which a pillow like support member is securely affixed to a rigid surface which may be used for working, eating, or other activities, such as playing cards. However, in such devices only one side of the activity surface may be utilized and, if the device is used as a "pillow," it is generally not flexible or comfortable due to the secure attachment of the rigid member thereto. Similarly, U.S. Pat. No. 4,788,916 issued to Saxton discloses a cushion pouch tray that is specifically designed so that only one side of the rigid tray member may be utilized when attached to the pouch. In particular, U.S. Pat. No. 4,788,916 is particularly directed to a serving tray in which the tray may be removed from the accompanying pouch for cleaning purposes.

Other portable activity surfaces which employ the use of legs to raise the surface above the surface on which the legs rest are also commonly available. Most commonly these surfaces are made of wood; however they are also available in other similarly rigid materials like metal or plastic and had non-inclined work surfaces.

A portable activity surface with greater flexibility and more utility greater comfort of use is desired.

BRIEF DESCRIPTION OF THE DRAWINGS

A better understanding of the present invention can be obtained when the following detailed description of various embodiments is considered in conjunction with the following drawings, in which.

Figure 1:
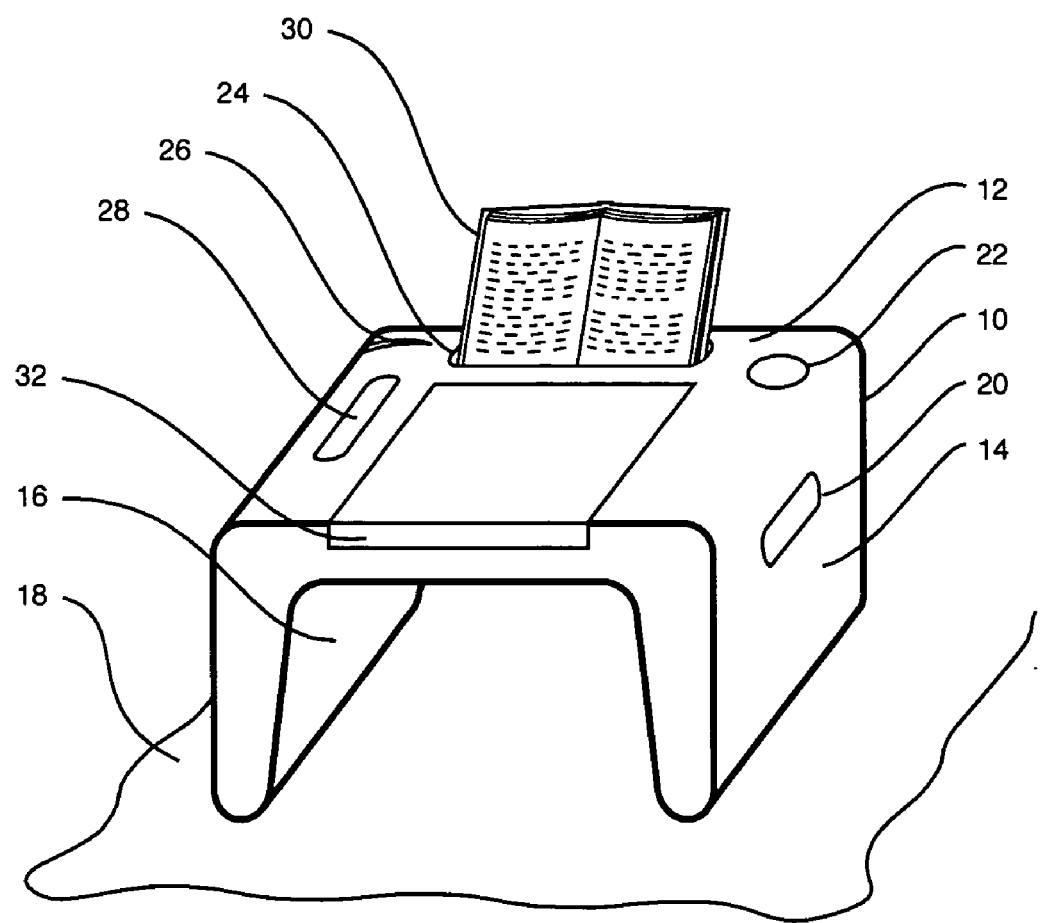
FIG. 1 illustrates an isometric view of one embodiment of the present invention.

While the invention is susceptible to various modifications and alternative forms, specific embodiments thereof are shown by way of example in the drawings and are described below in greater detail. It should be understood, however, that the drawings and detailed description thereto are not intended to limit the invention to the particular form disclosed, but to the contrary, the intention is to cover all modifications, equivalents and alternatives falling within the spirit and scope of the present invention as defined by the claims.

DETAILED DESCRIPTION OF SEVERAL EMBODIMENTS

FIG. 1 illustrates one embodiment of the present invention 10. It comprises a unit comprised of a top generally horizontal top member 12 and two generally vertical leg members 14 and 16. The leg members serve to position the horizontal top member 12 above some surface 18 such as a floor, bed, sofa, chair or car seat thus creating a work surface above said surface 18. In the preferred embodiment these members are constructed of nonabsorbent high-density foam. Such materials are frequently used for floating toys and water furniture and boat safety devices. Other materials would also be suitable. It is desirable for the foam material to be resilient and spring back to its original shape. It is also desirable that the material be nonabsorbent, stain resistant and relatively easy to clean and keep clean. It is desirable for the foam to be of sufficient density and thickness to maintain the structural integrity of the desired shape of the invention when subjected to the loads expected as a result of the activity to which the invention is intended to be used. For example it should maintain structural integrity if loaded by a laptop personal computer (not shown) and the weight and force imposed by the user of the laptop personal computer. In FIG. 1 shows the load of a book or magazine 30.

FIG. 1 also illustrates other features of the invention. For example a handle 20 one leg 14 (the handle on the other leg 16 is not shown. This embodiment also has a cup holder 22 and a slot 24 for receiving reading materials such as a magazine or a book 30 (not part of the device). In some embodiments like the one illustrated in FIG. 1 and FIG. 2 the book slot 24 is tilted by an angle 25. This can most easily be seen in FIG. 2. In deciding on the position of this slot 24 and its angle 25 the changes in the center of gravity of the lab desk resulting from placing a book in the slot should be considered. In alternative embodiments slot could be angled in the opposite direction so that the desk would be flipped around when used to hold a book. In alternative embodiments the slot could be more toward the front of the desk or center of the desk. In yet other embodiments of the invention a book-stand slot only appears when a panel 29 is removed from the desk surface similar to the wedge described below.

The embodiment also includes a narrow slot 26 which has a purpose that is discussed in greater detail in connection with FIG. 6 below. The embodiment also has a small recessed section 28 for holding writing instruments or other small items.

Figure 2:
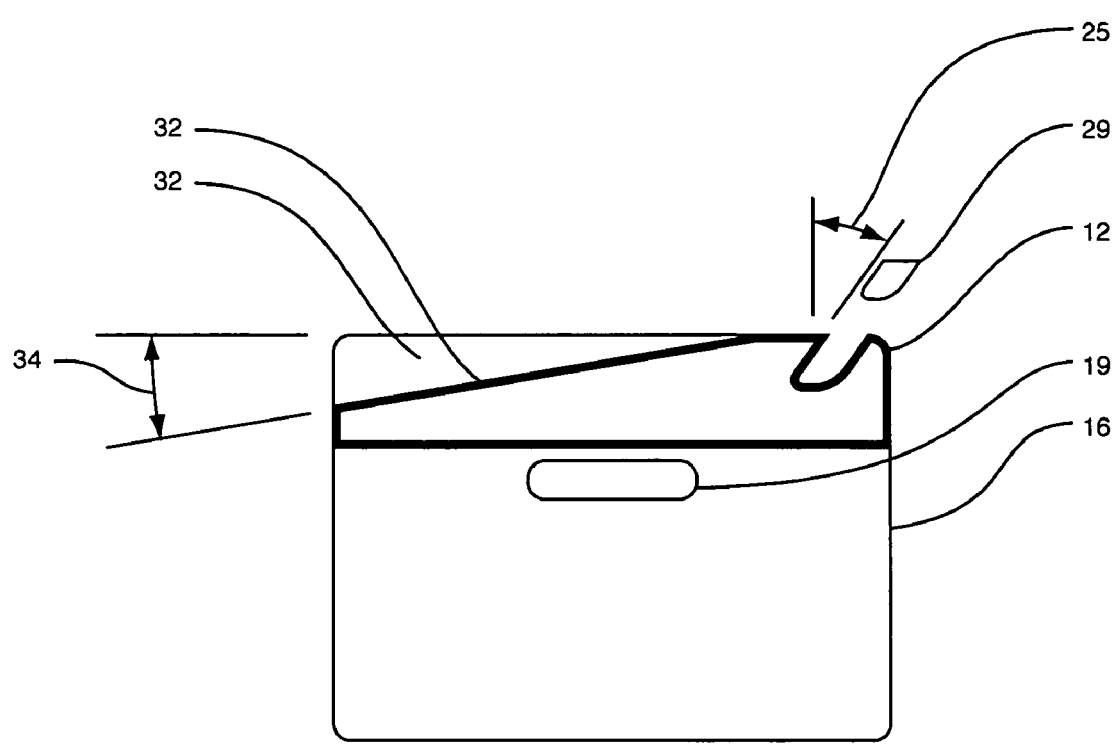
FIG. 2 illustrates a cross sectional view of the embodiment of the invention illustrated in FIG. 1.
Figure 3:
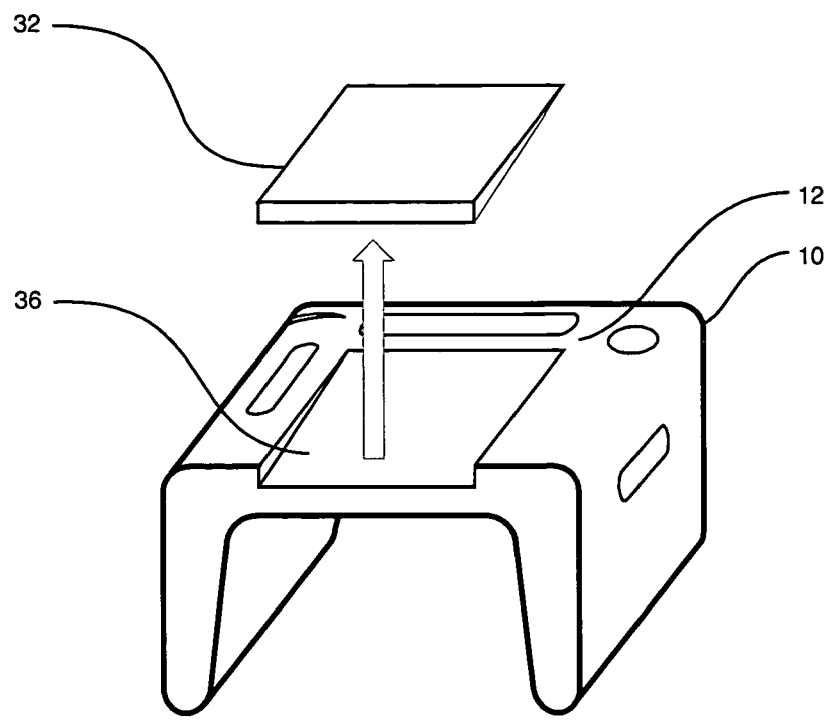
FIG. 3 is illustrates removal of a wedge section of the embodiment of the invention illustrated in FIG. 1 and FIG. 2 to create an more inclined work surface.

FIG. 1 FIG. 2 and FIG. 3 also illustrate another useful feature of the embodiment of the invention illustrated in these figures in the form of wedge member 32. The wedge member 32 can be removed from the top member 12. The Wedge member 32 is angled 34 so that when it is removed it leaves an incline section 36 (shown in FIG. 2 and FIG. 3) in the top surface of the top member 12. Although it is possible for the wedge member to be attached by some other attachment mechanism, in the embodiment shown the wedge member is held in place because it is slightly larger that the space in which it is kept. This larger size and the nature of the foam material tend to maintain the wedge in position unless it is removed by the user.

Figure 4:
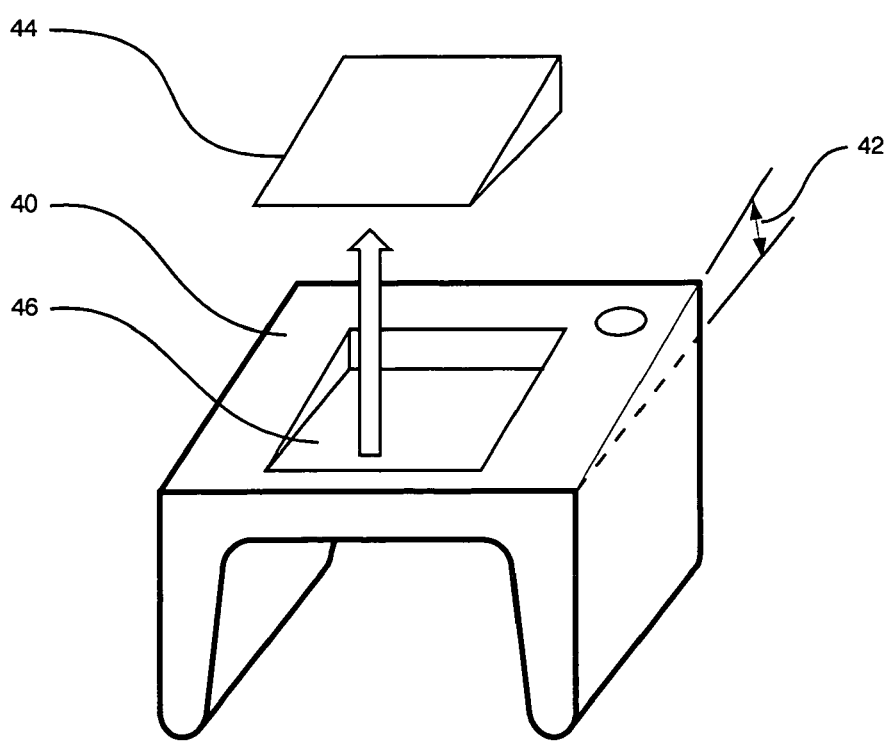
FIG. 4 illustrates an alternative embodiment of the invention where the work surface is inclined before a wedge section is removed and removal of the wedge creates a less inclined work surface.

FIG. 4 illustrated an alternative embodiment of the invention where the top surface of the top member 40 is inclined by a relatively acute angle 42 and has a wedge member 44 which when removed from the top member leaves a surface 46 which is less inclined than the surface of the top member 12. Although not shown this embodiment could incorporate the other features illustrated and discussed with FIG. 1, FIG. 2 and FIG. 3.

Figure 5:
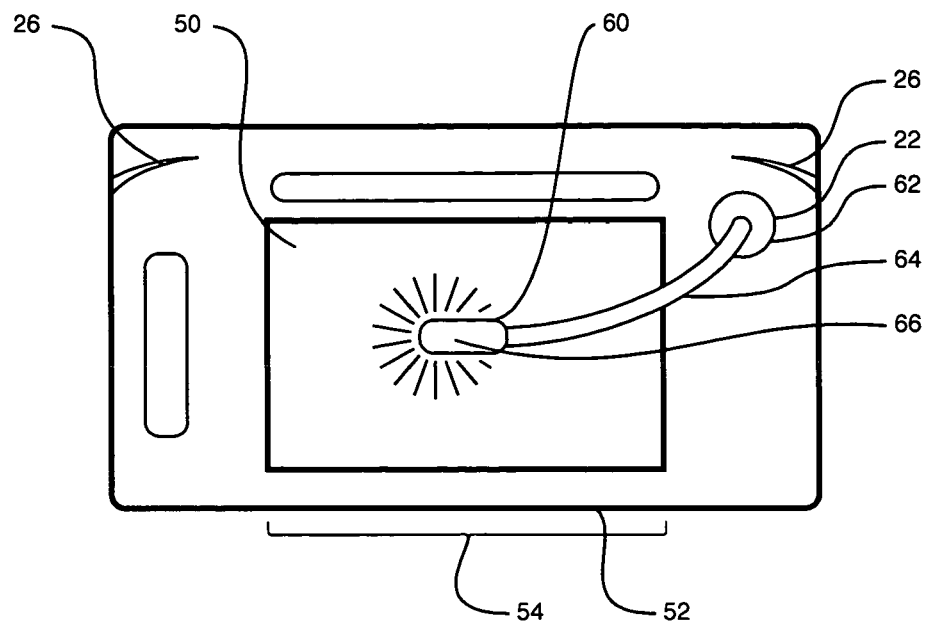
FIG. 5 illustrates an alternative embodiment of the invention where the removable section is recessed from the front edge to provide a palm rest when the section is removed.

FIG. 5 illustrates a top view of another embodiment of the invention. It may be of the type illustrated in FIG. 1, FIG. 2, FIG. 3 or the one illustrated in FIG. 4. The difference in this embodiment is that the removable wedge section 50 is recessed from the side 52 of the top member. The recess section 54 provides the user with a palm-rest which is particularly useful if the invention is used as a work surface to be used with a laptop personal computer. FIG. 5 also illustrates an electrical lamp 60 which extends from the cup holder 22. The batteries (not shown) are held in a cup-sized cylinder 62 which provides power through an arm 64 to the lamp 66.

Figure 6:
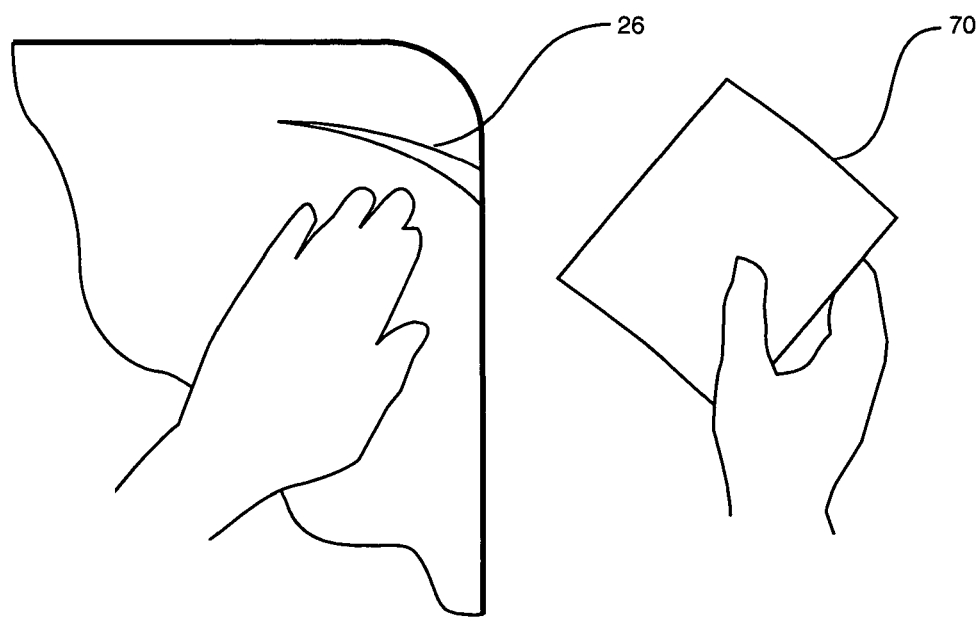
FIG. 6 illustrates the functionality of the paper holding slit.

FIG. 6 provides an illustration that shows how a piece of paper 70 or a document can be placed in the paper holding slit 26. In the embodiment shown the slit has a small curvature which has proved useful in maintaining the paper in an upright position. In prototypes the inventors found that the different depths would be equally workable. In addition although not shown in the figures it was useful to put a slight angle to the slit so that the paper when in place was slightly angled rather than normal to the surface of the desk.

Figure 7:
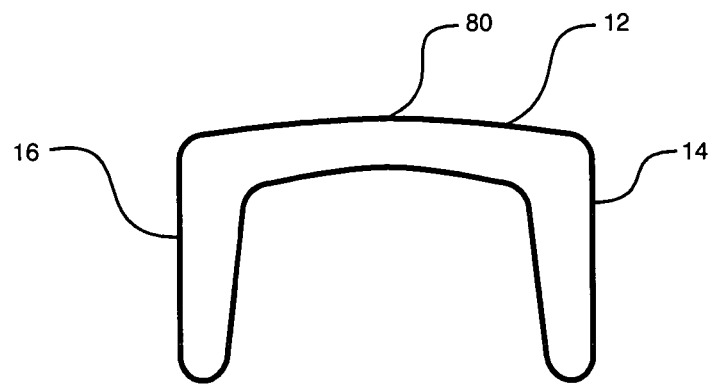
FIG. 7 is an exaggerated illustration of the shape of the top surface on one embodiment of the invention.

FIG. 7 illustrated in exaggerated fashion one feature of an embodiment of the invention—a slightly curved top surface 80 of the top member 12 The amount of curvature desired (if any) depends on a number of factors including but not limited to: the material used, the thickness of the material, the dimensions selected for the top and leg members and the load of the intended use of the invention. The objective is that under normal load the curve will disappear and the top surface 80 will be relatively flat. For example with less dense foams or thinner members more curvature would be necessary to support the same amount of load as if denser foam and thicker member were employed.

Figure 8:
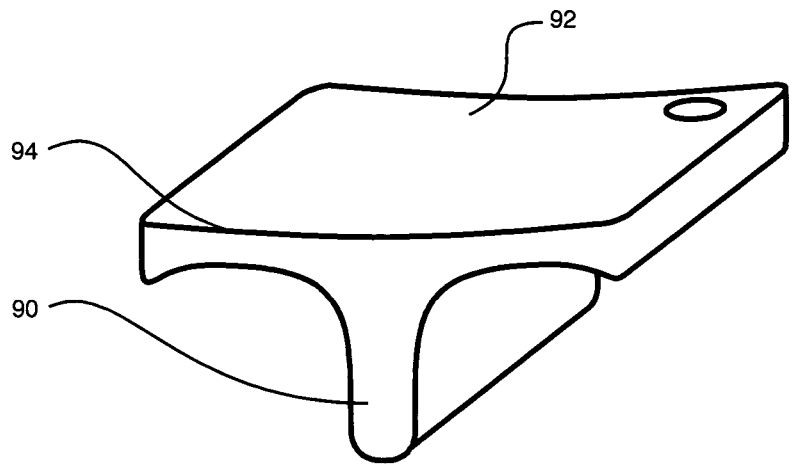
FIG. 8 is an illustration of an alternative embodiment of the invention with a center leg.
Figure 9:
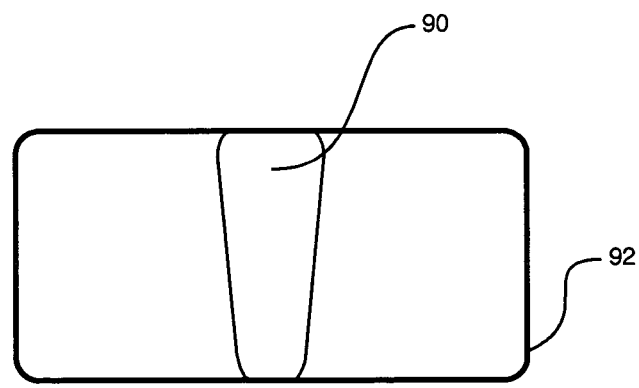
FIG. 9 is a bottom view illustration of an alternative embodiment of the one legged embodiment of the illustration in FIG. 8 where the leg is tapered.

FIG. 8 illustrates another embodiment of the invention which employs a single leg member 90 generally extending down from the center of the top member 92. In one embodiment of the invention this center leg member is tapered to better fit between the user's legs. See FIG. 9. The embodiment shown in FIG. 8 exaggerates a curvature of the top surface 94 of the top member 92. Similar factors are considered in shaping this curvature as were considered in the two-legged embodiment illustrated in FIG. 7. However because of the difference in the nature of loading the two embodiments the curvatures tend in opposite directions. In FIG. 8 the curvature curves up out from the center of the top surface 92. In FIG. 7 the curvature curves down out from the center of the top surface toward the leg members 16 and 14.

While the present invention has been described with reference to particular embodiments, it may be understood that the embodiments are illustrative and that the invention scope is not so limited. Any variations, modifications, additions and improvements to the embodiments described are possible. These variations, modifications, additions and improvements may fall within the scope of the invention as detailed within the following claims.

We claim:

1. A work surface comprising high-density foam structural members including:
   a) a generally horizontal member of generally uniform thickness and includes a removable and reinsertable tapered section that changes the angle of a work surface on the horizontal member; and
   b) one or more vertical member(s) extending from the horizontal member.

2. The work surface of claim 1 with only one vertical member extending from a general center of the horizontal member.

3. The work surface of claim 1 with two vertical members extending from the horizontal member.

4. The work surface of claim 3 where the two vertical members are generally parallel to each other.

5. The work surface of claim 1 where the removable section is constructed of a high-density foam material.

6. The work surface of claim 1 where the horizontal member is relatively thicker on one side then its opposite side so that the horizontal member is generally tapered from the relatively thicker side to the relatively thinner side.

7. The work surface of claim 6 where the horizontal surface includes a removable and reinsertable tapered section that changes the angle of the work surface on the horizontal member.

8. The work surface of claim 7 where the removable section is constructed of a high-density foam material.

9. The work surface of claim 1 where the horizontal member includes a slot for receiving reading materials.

10. The work surface of claim 9 where the slot in the horizontal member is exposed by removing a removable reinsertable section in horizontal member.

11. The work surface of claim 1 where horizontal member includes indentations for receiving pens, drink containers and/or small reading lights.

12. The work surface of claim 1 where the horizontal member includes a raised section to keep materials from rolling or slide off the horizontal member.

13. A work surface comprising high-density foam structural members including:
   a generally horizontal member of generally uniform thickness which includes a removable and reinsertable tapered section that changes the angle of a work surface on the horizontal member; and
   one or more vertical member(s) extending from the horizontal member.

14. The work surface of claim 13 where the removable section is constructed of a high-density foam material.

15. A work surface comprising high-density foam structural members including:
   a generally horizontal member relatively thicker on one side then its opposite side so that the horizontal member is generally tapered from the relatively thicker side to the relatively thinner side and includes a removable and reinsertable tapered section that changes the angle of the work surface on the horizontal member; and
   one or more vertical member(s) extending from the horizontal member.

16. The work surface of claim 15 where the removable section is constructed of a high-density foam material.

* * * * *